April 2, 1963      G. GRUNWALDT      3,084,283
TRANSISTOR-BATTERY SUPPLY FOR GAS-DISCHARGE TUBES
Filed March 15, 1960
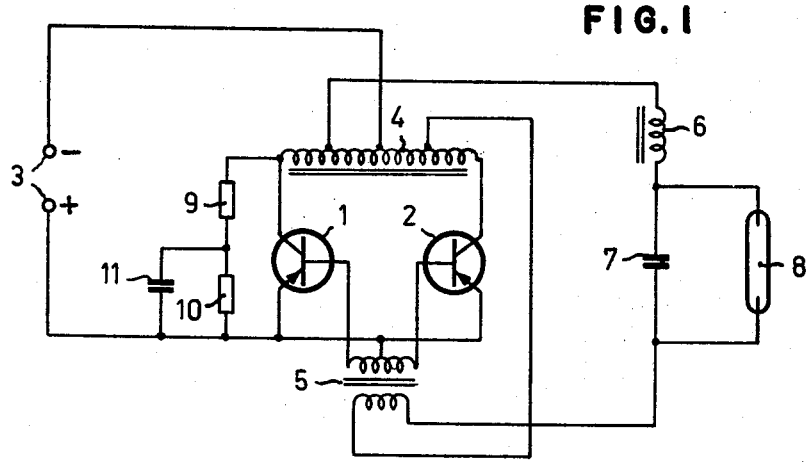
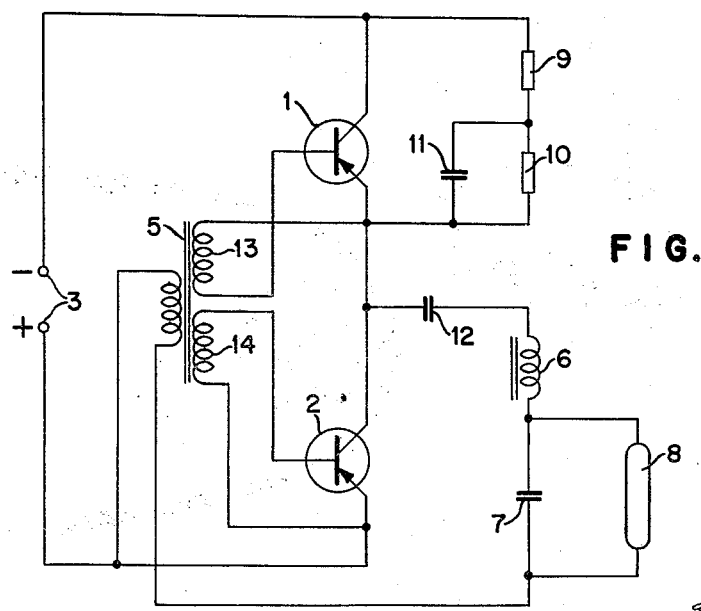
INVENTOR
G. GRUNWALDT
BY
AGENT

United States Patent Office 3,084,283
Patented Apr. 2, 1963

3,084,283
TRANSISTOR-BATTERY SUPPLY FOR
GAS-DISCHARGE TUBES
Gottfried Grunwaldt, Hamburg, Germany, assignor to
North American Philips Company, Inc., New York,
N.Y., a corporation of Delaware
Filed Mar. 15, 1960, Ser. No. 15,145
Claims priority, application Germany Apr. 30, 1959
5 Claims. (Cl. 315—205)

It is known to use a supply-device which transforms a D.C. supply-voltage into a periodic voltage of suitable value for igniting and supplying lamps operated by periodic voltages, for example, fluorescent lamps or other gas-discharge tubes, such as glow-discharge lamps; the periodic voltage thus produced is fed to the lamp by way of a reactance. The supply device may use electro-mechanical converters or transistor generators. The latter have the advantage that they permit the use of smaller transformers, component parts and circuit elements at higher frequencies.

The invention relates to such a supply device which uses a direct current source and a transistor generator. The device according to the invention is characterized in that the transistor generator is fed back via an LC series circuit and in that the load, usually a gas-discharge lamp, is connected in parallel with one element of this series circuit.

The supply device is suitable for all loads to be fed with a determined current, for example, arc lamps, gas-discharge lamps and the like. The device according to the invention has various advantages. Its current generator properties are particularly ideal for feeding fluorescent lamps. The automatically obtained ignition has a high energy and is rapidly performed. The waveform of the supplied current is particularly favourable for fluorescent lamps. There is no need for adjusting control-members. The influence of transistor tolerances and transistor aging on the operation of the device is negligible, so that the arrangement is readily reproducible. As compared with alternating current mains supply, the efficiency is materially improved. Moreover, the battery supply device according to the invention is particularly insensitive to fluctuations of the battery voltage; even an excessively low voltage does not adversely affect the ignition, so that the device is particularly advantageous for use in transport means such as autobusses, railway carriages and the like, where an accumulator of fairly high power is always provided.

The invention will be better understood from the following description, taken in conjunction with the accompanying drawings, in which:

FIG. 1 is a schematic circuit diagram of one embodiment in which an output transformer is used; and FIG. 2 is a schematic circuit diagram of another embodiment in which the output transformer is omitted.

FIG. 1 shows one embodiment for supplying a starterless fluorescent lamp. The converter comprises two transistors 1 and 2 (which may be of the type OC 30) of high power supplied from a direct voltage source 3, for example, a 24 v. accumulator; the converter supplies, via the output transformer 4, a square-wave alternating voltage of determined frequency. By way of a separate feed-back transformer 5, this voltage reaches an acceptor circuit comprising a choke coil 6 and a capacitor 7 connected in series, this capacitor being shunted by the load, for example, the fluorescent lamp 8. The whole device may be housed in a small box, which is directly appended to the fluorescent lamp.

Whereas with the known supply devices the voltage supplied by the converter exceeds the voltage operative at the load and the required current supply to the load is approximately obtained by means of a complex resistor network connected in series therewith, the voltage of the converter of the device according to the invention is generally lower than the voltage at the load. The required step-up transformation is achieved by means of the resonance of the LC series circuit.

In practice the resistance of the fluorescent lamp is, as is known, not linear and reaches an infinite value at each zero passage of the voltage. In the operative condition, the fluorescent lamp together with the LC series circuit may be considered approximately as an ohmic resistance, which has been assumed in a theoretical analysis of the operation.

The feed-back obtained by the transformer 5 for the self-excitation of the converter is in phase with the output current thereof. Thus, the frequency obtained always adjusts itself so that the input resistance of the LC-series circuit 6, 7 loaded by a real resistor via the capacitor 7 becomes real at said working frequency. The frequency drops according as the resistor connected via the capacitor 7 is smaller. Under these conditions, it can be proved that, if the choke 6 and the capacitor 7 are free of losses, the current supplied to the ohmic load 8 by the capacitor 7 is independent of the resistance value thereof. This current depends only upon the alternating voltage at the input of the series circuit 6, 7 and upon the quotient $$\sqrt{\frac{L}{C}}$$

(L designates the inductance of the choke 6) (C=the capacity of the capacitor 7). In a practical embodiment the capacity of the capacitor amounted to 1.5 $\mu$f. and the inductance of the choke to 3.7 mh. The converter is therefore a true current generator with a theoretically infinitely high internal resistance. Therefore the fluorescent lamp 8 ignites completely automatically. Indeed, before the lamp ignites, the input resistance of the acceptor circuit is very low, so that high excess voltages occur across the choke and the capacitor, due to resonance. At the instant of ignition, the acceptor circuit has accumulated so much energy that, due to the high ignition power, ignition is quite certain to occur.

The ignition, moreover, occurs so soon after switching on that the delay is not perceptible.

The fluorescent lamp 8 can be connected across the choke 6 instead of the capacitor 7. In this case, the arrangement operates just as well, the waveform of the supplied current being however less favourable with respect to the life duration of the lamp.

In order to ensure oscillation of the converter at switching on, an RC-circuit with resistors 9, 10 and a capacitor 11 can be provided for supplying a first pulse starting the oscillation at switching on.

In accordance with the desired dimensions, the transistor converter can also be connected in a manner different from that shown in FIG. 1. The transformer 4 may, for example, be omitted if the transistors are connected in series across the battery terminals and are controlled in phase opposition by separate secondary windings of the transformer 5. This circuit arrangement is shown in FIG. 2; like reference numerals in both figures refer to the same circuit elements. As can be seen from FIG. 2, the transformer 5 comprises separate secondary windings 13 and 14. The lower end of winding 13 is connected to the base of transistor 1 and the upper end of winding 14 is connected to the base of transistor 2 as shown; the other ends of the windings are connected to the respective emitter electrodes. The emitter-collector paths of the transistors are connected in series across the battery terminals. The squarewave output voltage is then derived via a capacitor 12, between the common connection point of the transistors and a terminal of the battery. As an alternative, use can be made of a converter arrangement comprising only one transistor, a transformer and a limiter diode.

What is claimed is:

1. A supply device for at least one periodically ignited gaseous discharge tube, comprising: a direct current source of energy, a transistor generator connected to said source and producing alternating current therefrom, a feedback circuit for said generator, an LC series circuit, said feedback circuit being coupled from the output to the input of said generator through said LC series circuit, and a gaseous discharge lamp connected in parallel with one element of said series circuit.

2. A supply device as claimed in claim 1, said generator including at least one pair of push-pull connected transistors and an autotransformer coupling the outputs of said transistors, the generator delivering a substantially square-wave output voltage.

3. A supply device as claimed in claim 2, wherein said feedback circuit includes a separate transformer, the primary winding of which is connected in series with the LC series circuit and the secondary winding of which feeds the base-emitter paths of the transistors.

4. A supply device as claimed in claim 1, wherein said feedback circuit includes a separate transformer, the primary winding of which is connected in series with the LC series circuit and the secondary winding of which feeds the base-emitter path of the transistor.

5. A supply device as claimed in claim 1, said generator including at least one pair of transistors connected in series across the direct current source, said feedback circuit including a feedback transformer having separate secondary windings driving the transistors in phase opposition, the primary winding of the transformer being connected in series with the LC series circuit, a capacitor coupled from the junction point of said transistors to one terminal of said source, a substantially square-wave output voltage being obtained between said capacitor and said one terminal.

References Cited in the file of this patent

UNITED STATES PATENTS

| 2,849,615 | Gustafson | Aug. 26, 1958 |
| 2,928,994 | Widakowich | Mar. 15, 1960 |

FOREIGN PATENTS

| 805,137 | Great Britain | Dec. 3, 1958 |